United States Patent [19] [11] Patent Number: 5,872,597
Yamakage et al. [45] Date of Patent: Feb. 16, 1999

[54] SYSTEM FOR DECODING MOVING PICTURE SIGNAL MULTIPLIED AND CODED BY DCT COEFFICIENT AND ADDITIONAL DATA

[75] Inventors: Tomoo Yamakage, Kawasaki; Toshinori Odaka, Yokohama, both of Japan

[73] Assignee: Kabushiki Kaisha Toshiba, Kanagawa-ken, Japan

[21] Appl. No.: 683,103

[22] Filed: Jul. 16, 1996

Related U.S. Application Data

[63] Continuation of Ser. No. 296,799, Aug. 26, 1994, abandoned.

[51] Int. Cl.⁶ .................................................. H04N 7/18
[52] U.S. Cl. ........................ 348/402; 348/416; 348/415; 348/699; 348/845.1
[58] Field of Search ................................ 348/416, 415, 348/405, 404, 402, 699, 423, 700, 419, 464, 845.1

[56] References Cited

U.S. PATENT DOCUMENTS

| | | | |
|---|---|---|---|
| 5,164,828 | 11/1992 | Tahara et al. | 348/412 |
| 5,185,819 | 2/1993 | Ng et al. | 348/402 |
| 5,253,056 | 10/1993 | Puri et al. | 348/409 |
| 5,337,086 | 8/1994 | Fujinami | 348/409 |
| 5,371,547 | 12/1994 | Siracusa et al. | 348/415 |
| 5,376,968 | 12/1994 | Wu et al. | 348/402 |
| 5,557,332 | 9/1996 | Koyanagi et al. | 348/416 |

Primary Examiner—Tommy P. Chin
Assistant Examiner—Anand S. Rao
Attorney, Agent, or Firm—Foley & Lardner

[57] ABSTRACT

A moving picture signal decoding system includes a processing order determination element having a logic calculation device for decoding additional data, determining as to whether an orthogonal transformation is performed with respect to a divided signal of each block or a residual signal after motion compensation, and changing a processing order in accordance with a determined content; a decoding element for decoding transformation coefficient data; an inverse scanning element for inversely scanning the transformation coefficient decoded by the decoding element; an inverse quantization element for inversely quantizing the transformation coefficient after inversely scanning; an inverse orthogonal transformation element for inversely and orthogonally transforming the inverse quantized signal; and a motion compensation element for compensating a motion on the basis of the additional data decoded by the processing order determination element; wherein the processing order determination element decompresses the additional data while the decoding element decodes the transformation coefficient, thereby miniaturizing a circuit scale. Therefore, it is possible to provide a moving picture decoding system capable of operating in higher speed. Also, it is possible to provide a flexible decoding system corresponding to various coding systems.

5 Claims, 12 Drawing Sheets

SYSTEM FOR DECODING MOVING PICTURE SIGNAL MULTIPLIED AND CODED BY DCT COEFFICIENT AND ADDITIONAL DATA

This application is a continuation of application Ser. No. 08/296,799, filed Aug. 26, 1994, now abandoned.

BACKGROUND OF THE INVENTION

The present invention relates to a system for decoding a moving picture signal which is coded by using a variable length code for an image communication, transmission and storage, and more particularly to a system for decoding a moving picture signal which is generated by multiplexing a discrete cosine transform (DCT) coefficient and additional data, such as an H.261 system and a moving picture expert group (MPEG) system.

FIG. 1 is a block diagram showing an example of coding a moving picture signal in accordance with the H.261 and MPEG systems, in which the H.261 and MPEG are a standardization committee for coding a moving picture signal.

There will be described below a coding system shown in FIG. 1. An original picture signal $S_1$, which is input through an input terminal 1 at every macro-block, is divided into one which is input into a motion compensation determination circuit 3 as it is, and the other which is input into a motion compensation circuit 2. The motion compensation circuit 2 performs a motion prediction on the basic of a content of a reference image memory 4 so as to output a motion compensation residual signal $S_2$, a motion vector signal $S_3$ and a reference image signal $S_4$. The motion compensation determination circuit 3 receives the original signal $S_1$ and the residual signal $S_2$ after the motion compensation and determines as to whether or not a motion compensation should be performed, so as to output a selected signal $S_5$ and a flag signal $S_6$ which shows a selection of any of the signals. A discrete cosine transform (DCT) circuit 5 divides the selected signal $S_6$ into small blocks and performs a DCT transformation so as to output a DCT coefficient signal $S_7$. A quantization circuit 6 quantizes the DCT coefficient signal $S_7$ to generate and output a quantized value signal $S_8$ to a scanning conversion circuit 10 and an inverse quantization circuit 7. The scanning conversion circuit 10 scans the quantized value signal $S_8$ with zigzags to output a scanning result to a variable length coding circuit 11. The variable length coding circuit 11 encodes and multiplies the scanning result scanned with zigzags, the flag signal $S_6$ showing the determination flag for the motion compensation and the motion vector signal $S_3$ so as to output a coded output $S_{10}$.

On the other hand, the inverse quantization circuit 7 inversely quantizes the quantized value signal $S_8$ so as to output an inversely quantized result to an inverse DCT circuit 8. The inverse DCT circuit 8 performs an inverse DCT transformation so as to output an inverse DCT result to a local decode signal generation circuit 9. The local decode signal generation circuit 9 receives the reference image signal $S_4$, the flag signal $S_6$ and the inverse DCT result, and adds the reference image signal $S_4$ with the inverse DCT result so as to output a local decode signal $S_8$ when the motion compensation is performed. When the motion compensation is not performed, the local decode signal generation circuit 9 makes the local decode signal $S_9$ from the inverse DCT result as it is. An output of the local decode signal generation circuit 9 is stored in the reference image memory 4.

FIG. 2 shows a conventional system for decoding the moving picture signal which is encoded by the method shown in FIG. 1 and corresponding to the coding as the standardization of the moving picture.

A coded image signal is input through an input terminal 21 to a variable length code decoding circuit 22 which decodes a variable length code, so as to divide the coded image signal into a DCT coefficient signal $S_{11}$ and an additional data signal $S_{12}$. The DCT coefficient signal $S_{11}$ is inverted its scanning in a scanning conversion circuit 23, is inversely quantized in an inverse quantization circuit 24, and is inversely transformed a discrete cosine transform, thereby outputting a result to a decoded signal generation circuit 26. The additional data signal $S_{12}$ is supplied to an additional data redundancy decompression circuit 27 which decompresses the data signal $S_{12}$ to generate a motion compensation determination flag signal $S_{13}$ and a motion vector data signal $S_{14}$. The motion compensation determination flag signal $S_{13}$ is supplied to a motion compensation circuit 28 and the decoded signal generation circuit 26, while the motion vector data signal $S_{14}$ is supplied to the motion compensation circuit 28. The motion compensation circuit 28 reads out a reference image from the reference image memory 29 on the basis of the motion vector data signal $S_{14}$ to output a reference image signal $S_{15}$ to the decoded signal compensation circuit 26. The decoded signal compensation circuit 26 receives the result of the inverse DCT, the reference image signal $S_{15}$ and the motion compensation determination flag signal $S_{13}$, and generates a decoded signal $S_{16}$ by adding the reference image signal $S_{15}$ with the result of the inverse DCT when the motion compensation is performed. On the contrary, when the motion compensation is not performed, the result of the inverse DCT becomes the decoded signal $S_{16}$. The decoded signal $S_{16}$ is also stored in the reference image memory 29 and used as a reference image when the next image is decoded.

There are the H..621 system and MPEG system as a moving picture coding system by combining the DCT and the motion compensation. All of these systems perform a coding by multiplexing the additional data and the DCT coefficient in accordance with a specific rule (syntax), respectively. When a decoding is performed, the decoding should be advanced with a sequentially analysis for a syntax of a bit stream. Furthermore, since the additional data are transmitted by taking a previous value prediction (DPCM—differential pulse code modulation—) code with a previous macro-block, it is necessary to decode the DPCM code.

Since the conventional system for decoding a signal standardized by the H.261 system has a low symbol rate after decoding a code, the variable length code decoding circuit 22 shown in FIG. 2 interprets a syntax by a serial bit to decode the variable length code, thereby realizing a compact and small scale decoding circuit.

However, even though the conventional system decodes a code with a serial bit, if the symbol rate becomes high, the variable length code decoding circuit is not in time for operation. By a simple calculation, in the variable length code decoding circuit of a serial bit type for decoding a variable length code having 10 bit of the maximum code length by a symbol rate of 27 MHz/sec after decoding, it is necessary to use a clock frequency of "27 (MHz)×10=270 (MHz)", thereby resulting in a difficult utilization.

Accordingly, when the symbol rate is high, it is necessary to provide a variable length code decoding circuit which can decode one symbol by one clock. Even though such a circuit can be utilized by a method disclosed in Japanese Patent Application Laid-open No. 3-286855 (1991), the prior art has the problem that a circuit scale becomes larger. Accordingly, there is an attempt to suppress an increase of the circuit scale by combining a decoding circuit having a low operation speed and a small circuit scale with a decoding circuit having a high operation speed and a large circuit scale.

As described above, in the conventional moving picture decoding system, since the circuit scale becomes large if the symbol rate is high, there is provided a countermeasure to suppress the increase of the circuit scale through trial and error at a present. Especially, a moving picture reproduction system is provided as a system using the MPEG method on a display terminal of a compact disc (CD) do-it-oneself vocals audio visual system (a CD KARAOKE system) and a personal computer (PC), they are desired to be a compact size. Accordingly, the moving picture decoding circuit is made by one chip device and it is necessary to miniaturize the entire system.

On the other hand, if the syntax of bit stream is analyzed by a hardware sequencer, it becomes a special purpose chip. An MPEG syntax allows to include data which can be defined by a user. Accordingly, a syntax analyzer is desired to be able to be programmed and to use a logic calculation element such as an ALU. However, since the utilized efficiency is wrong by using the ALU only in the syntax interpretation, it is necessary to increase the utilized efficiency.

SUMMARY OF THE INVENTION

In order to solve the above-mentioned condition, an object of the present invention is to provide a system for decoding a moving image signal, capable of miniaturizing a circuit scale by combining a decoding circuit having a small circuit scale and high speed operation with an arithmetic and logic unit (ALU), thereby enabling a program of a bit stream syntax and a common use of other necessary processing and the moving picture decoding by the ALU.

To achieve the above object, the present invention provides a method for decoding a moving picture coded signal, by decoding a moving picture coded signal including motion vector data and prediction error data, the motion vector data which shows a motion in a moving picture, and the prediction error data which is a discrepancy between an original moving picture and a predicted moving picture by using the motion. The decoding method of the present invention comprises a step of decoding a variable length code about the motion vector data; a step of decoding a variable length code about the prediction error data; and a step of decompressing a redundancy of the variable length code decoded about the motion vector data as a parallel processing while the variable length code about the prediction error data is decoded.

Furthermore, the present invention provides a system for generating a decoded moving picture signal by decoding moving picture coded data including motion vector data showing a motion in a moving picture, and prediction error data as a discrepancy of an original moving picture and a moving picture predicted by using the motion. The decoding system comprises decoding control means for starting operation when header data attached before the motion vector data are supplied after receiving said moving picture coded data supplied, for controlling a decoding of each of the prediction error data and additional data including the header data and the motion vector data, and for controlling a decompression of a redundancy of a variable length code of the motion vector data after being decoded; first decoding means for decoding the variable length code of the motion vector data included in the moving picture coded data responsive to a decoding start signal outputted from the decoding control means, thereby outputting a decoding end signal; second decoding means for decoding the variable length code of the prediction error data on the basis of a control of the decoding control means after the decoding end signal is outputted; and decompression means for decompressing a redundancy of the variable length code of the motion vector data which are decoded by said first decoding means, while the second decoding means are decoding the variable length code of the prediction error data: wherein the decoding control means, the first decoding means and the decompression means are constituted in a same module as parallel processing means, thereby parallel processing the decoding of the variable length code of the prediction error data and the decompression of the redundancy of the variable length code of the motion vector data by controlling an operation timing of decoding operation of the second decoding means and decompression operation of the decompression means by means of the decoding control means.

Since the present invention decompresses the additional data by the processing order determination means while the decoding means decodes the transformation variable, it is possible to miniaturize the circuit scale, thereby providing the moving picture signal decoding system capable of operating in higher speed.

As described above, the present invention can provide a moving picture decoding system capable of miniaturizing the circuit scale and operating in higher speed.

Furthermore, it is possible to flexibly decode a signal corresponding to various coding systems.

DETAILED DESCRIPTION OF THE PREFERRED EMBODIMENTS

There will be described in detail a decoding system and method for a moving picture coded signal according to preferred embodiments of the present invention in reference with the attached drawings.

Figure 1:
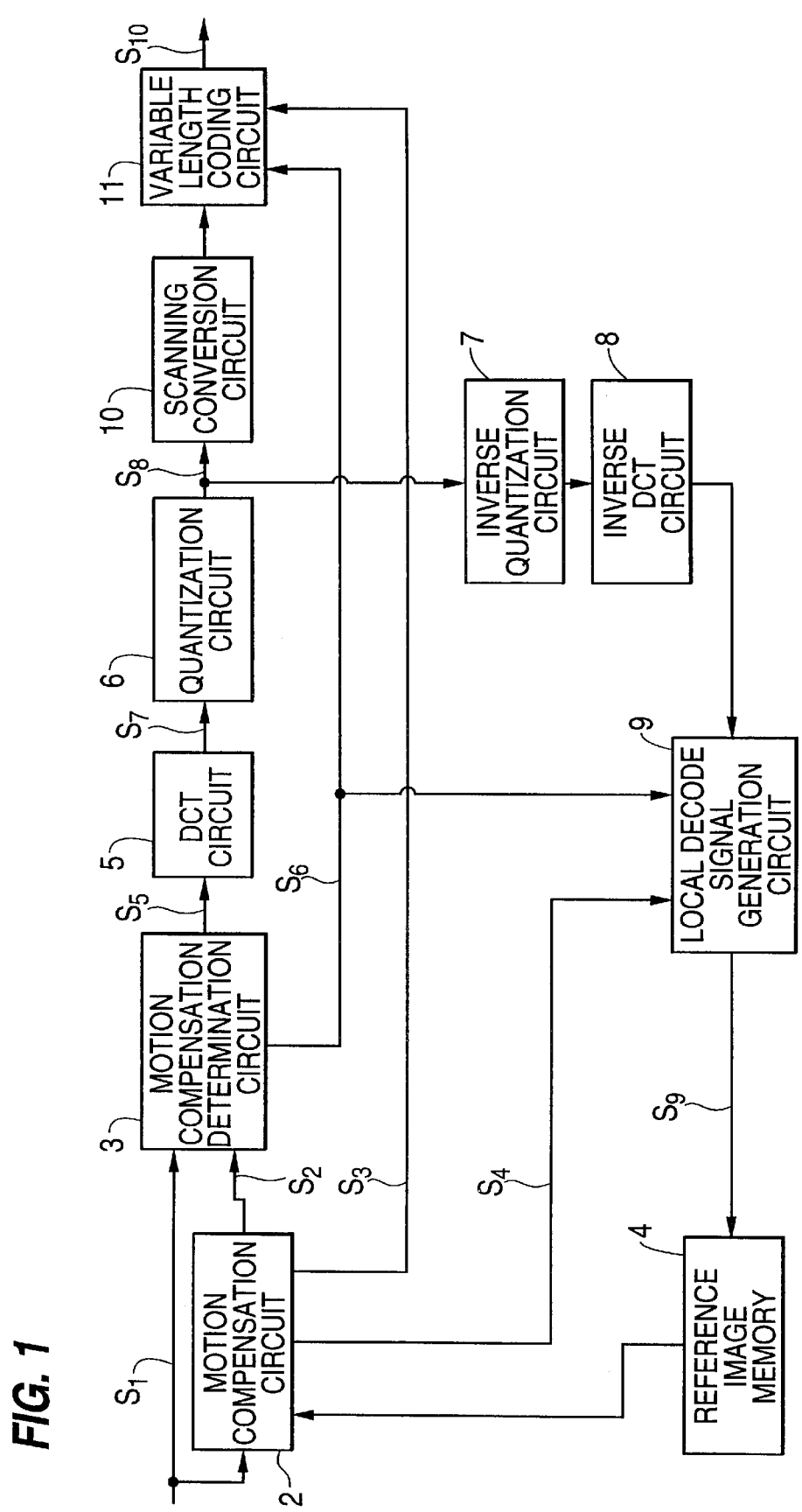
FIG. 1 is a block diagram showing a schematical configuration of the general system for coding a moving picture signal.
Figure 2:
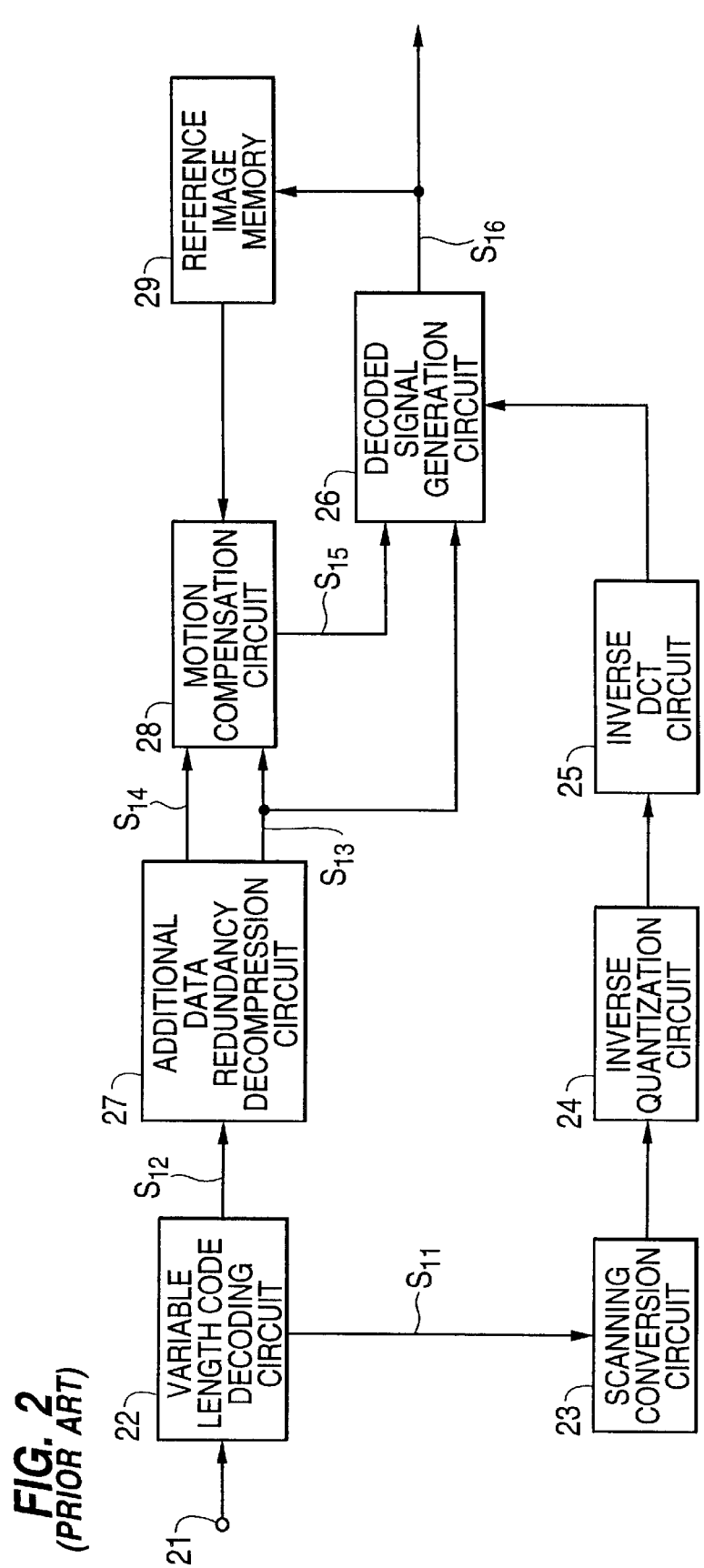
FIG. 2 is a block diagram showing a schematical configuration of the conventional system for decoding the moving picture signal.
Figure 3:
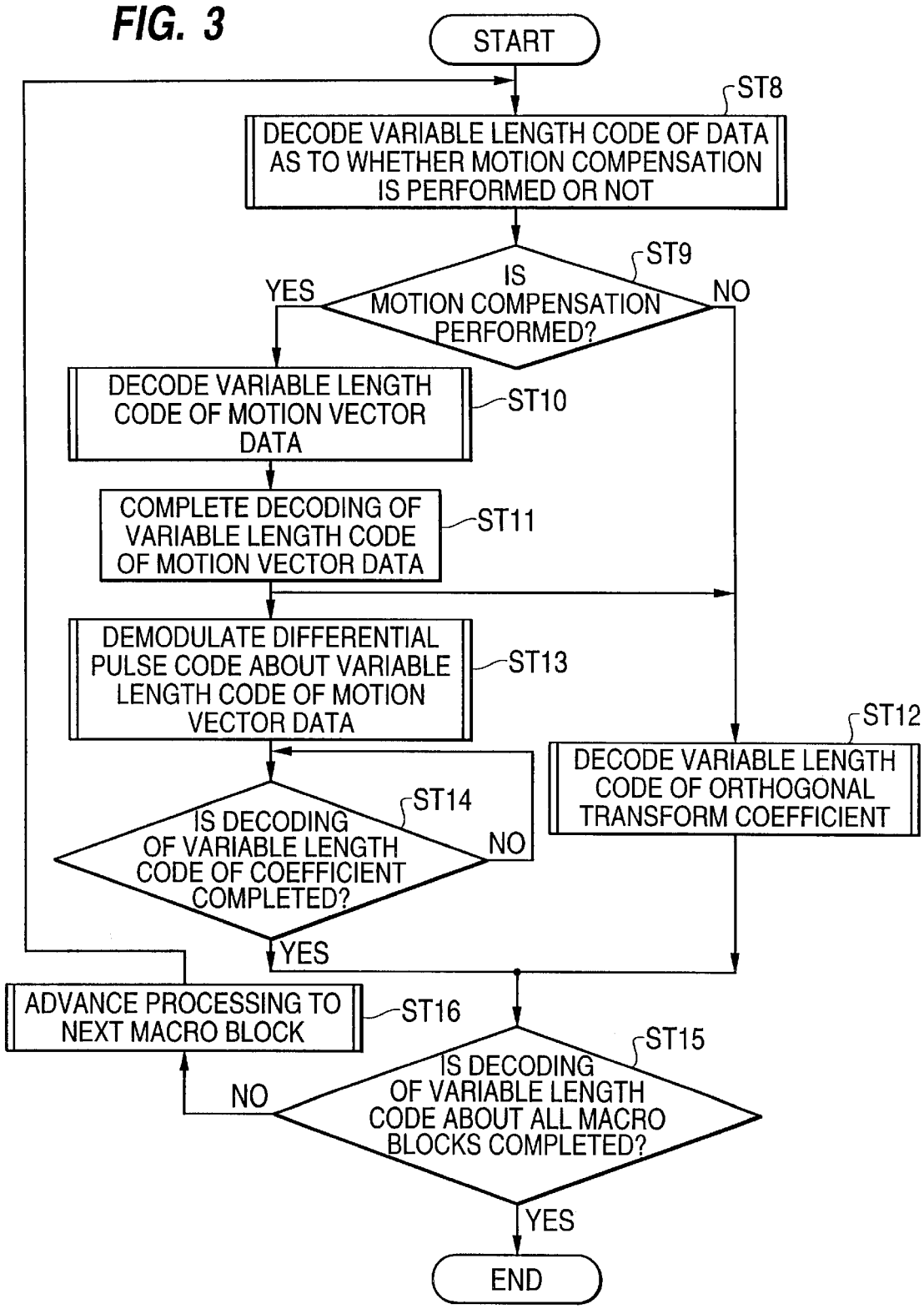
FIG. 3 is a flow chart showing a method for decoding a moving picture coded signal according to a first embodiment of the present invention.
Figure 12:
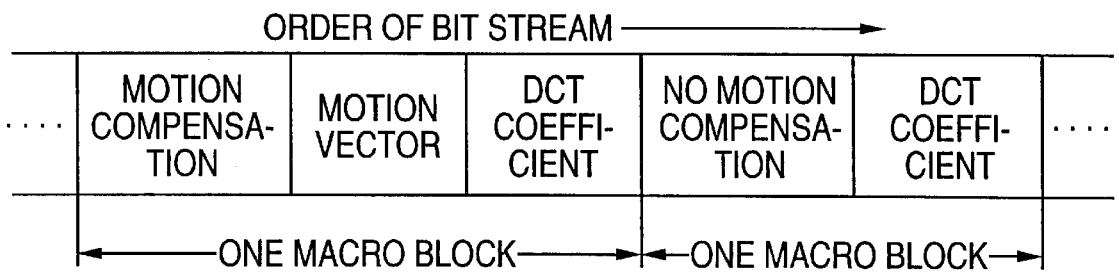
FIG. 12 is an explanation view showing an arrangement of a bit stream supplied into the instruction memory in the configuration shown in FIG. 10.

FIG. 3 is a flow chart showing processing steps in a decoding method for a moving picture coded signal according to a first embodiment as a primary basic concept of the present invention. The decoding method of the first embodiment, decodes a moving picture coded signal of a bit stream necessarily including identified data showing an execution or inexecution of a motion compensation in one macro block. A concrete configuration of the bit stream of the moving picture signal is shown in FIG. 12 which will be described later.

Accordingly, as shown in FIG. 3, in step ST8, a variable length code (VLC) is decoded with respect to identified data of an execution or inexecution of a motion compensation. In step ST9, a determination as to whether the identified data is the execution or inexecution of the motion compensation causes a processing flow to be divided into two flows.

In step ST9, when it is determined to perform the motion compensation by the identified data of the execution of the motion compensation being attached as a header of a certain macro block, a processing advances to step ST10. In step ST10, the variable length code of the motion vector data ia decoded. The decoding of the variable length code is completed in step ST11.

On the other hand, in step ST9, when it is determined not to perform the motion compensation by the identified data of the non-execution of motion compensation being attached as the header of the macro block, a processing advances to step ST12. In step ST12, the variable length code is decoded with respect to an orthogonal transform coefficient such as a karhunen-Loéve transform (KLT), discrete cosine transform (DCT) or the like.

In the case where the motion compensation is performed, when the variable length code decoding is completed with respect to motion vector data in step ST11, a processing flow is divided into two ways so as to advance to a parallel processing mode. One is in step ST12 for decoding the variable length code of the orthogonal transform coefficient, and the other is in step ST13 for demodulating a differential pulse code (DPC) with respect to the variable length code of the motion vector data which are completed to be decoded in steps ST10 and ST11. Steps ST12 and ST13 are parallel processing. Since it generally takes a predetermined time in step ST12 longer than that in step ST13, after the differential pulse code is demodulated in step ST13, it is determined whether or not the decoding of the variable length code of the coefficient is completed in determination step ST14.

In step ST14, when the decoding of the variable length code of the coefficient is determined to be completed, a determination is done as to whether the decoding of the variable length code of all macro blocks is completed or not in step ST15. As a result of the determination in step ST15, when the decoding with respect to all the macro blocks is completed, a processing finishes with respect to the decoding of the variable length code. As a result of the determination in step ST15, in the case where there remains any of the macro blocks in which the variable length codes are not completed, the decoding of the variable length code is performed with respect to the succeeding macro blocks (step ST16).

Figure 4:
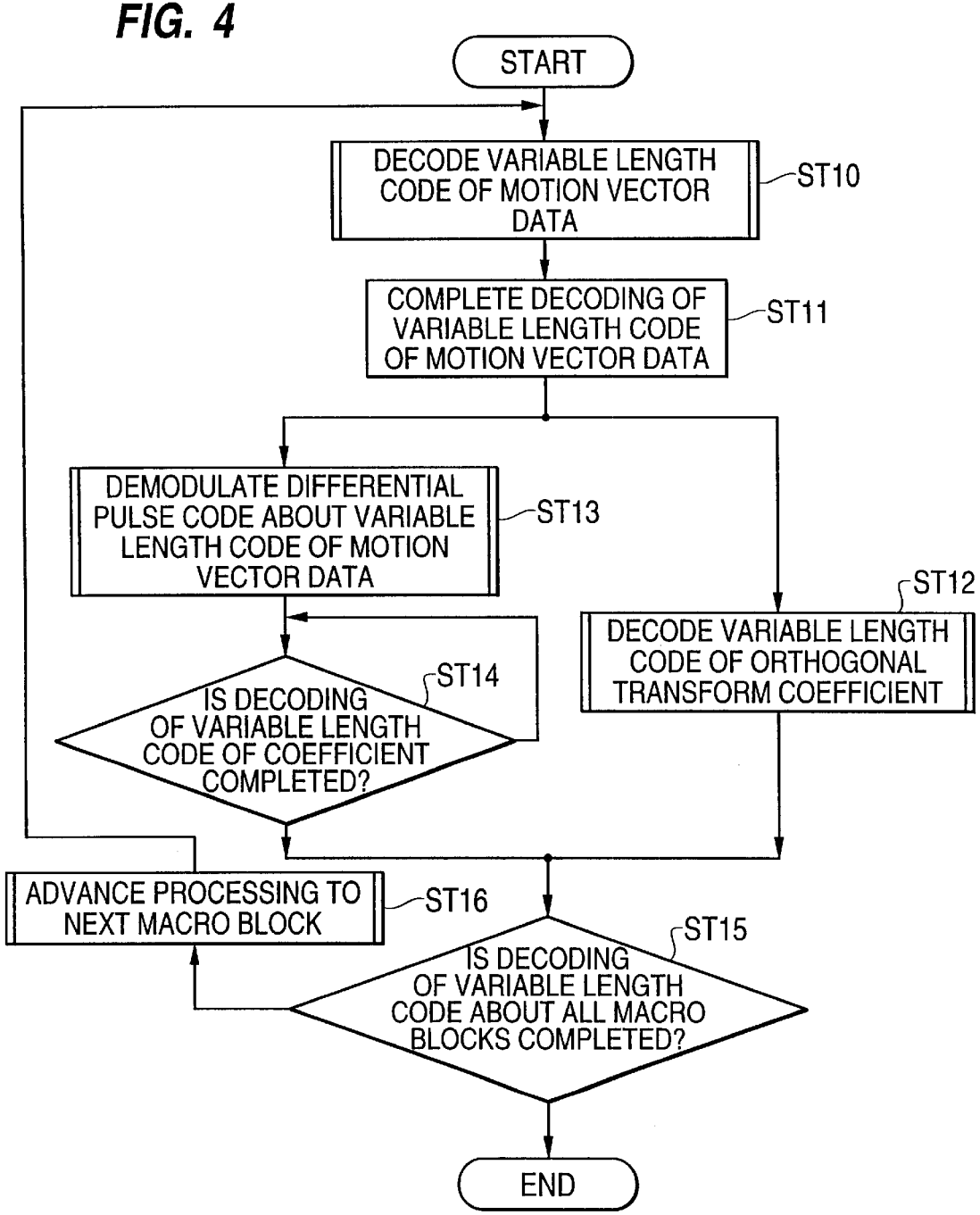
FIG. 4 is a flow chart showing a method for decoding a moving picture coded signal according to a second embodiment of the present invention.

Next, there is described processing steps of a decoding method of a moving picture coded signal according to a second embodiment as the second basic concept of the present invention in accordance with FIG. 4. The decoding method according to the second embodiment decodes a moving picture coded signal to which identified data of an execution of a motion compensation attach and which includes motion vector data in all of macro blocks.

Accordingly, a processing starts from step ST10 in FIG. 4, and steps ST8 and ST9 in FIG. 3 are eliminated in FIG. 4 because it is unnecessary for the second embodiment to provide a determination stop as to whether or not a motion compensation should be performed after decoding the variable length code with respect to the identified data. In steps ST10 and ST11, the variable length code of the motion vector data to be decoded is that the motion compensation portion is removed from an arrangement of macro blocks on the left side in FIG. 12.

Since concrete processing contents in particular processing steps from ST10 through ST 16 in FIG. 4 are substantially the same as those of the first embodiment in FIG. 3, a duplicated description is eliminated.

Figure 5:
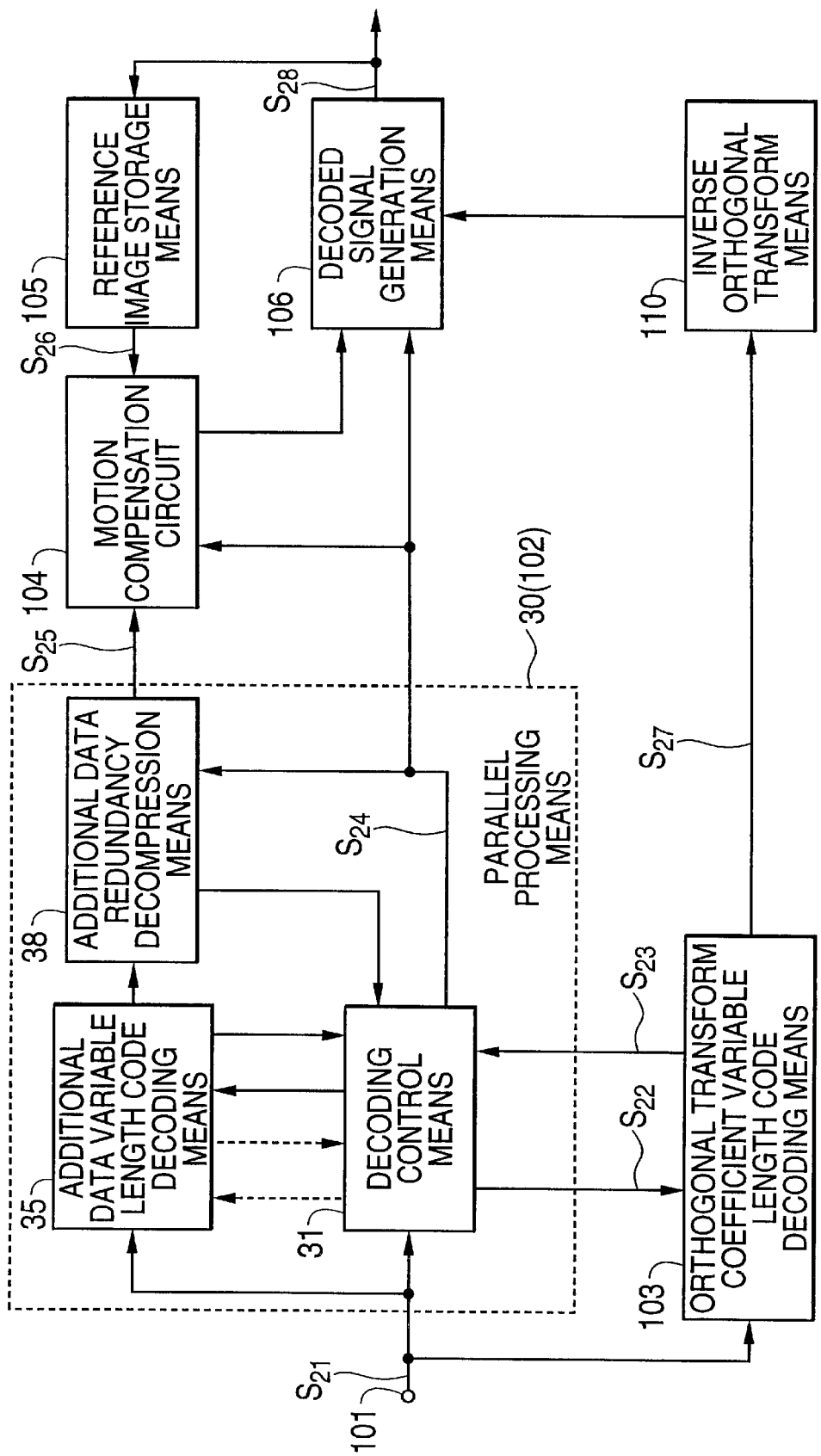
FIG. 5 is a block diagram showing a decoding system of a moving picture coded signal according to a third embodiment of the present invention.

FIG. 5 is a block diagram showing a schematic configuration of a decoding system for a moving picture coded signal according to a third embodiment as the third basic concept of the present invention.

In FIG. 5, a decoding system comprises a parallel processing means 30 (102) for controlling a parallel processing of a decompression of a redundancy of additional data and a decoding of a variable length code of an orthogonal transform coefficient after decoding a variable length code of the additional data such as identified data and motion vector data. The parallel processing means 30 (102) comprises decoding control means 31 for controlling a decoding of respective variable length code of the additional data and the orthogonal transform coefficient, additional data variable length code decoding means 35 for decoding a variable length code of the additional data of a moving picture coded signal $S_{21}$ inputted through a terminal 101, and additional data redundancy decompression means for decompressing the additional data in which the variable length code is decoded. The decoding system further comprises orthogonal transform coefficient variable length code decoding means 103 for decoding a variable length code of an orthogonal transform coefficient of the input moving picture coded signal $S_{21}$, inverse orthogonal transform means 110 for inversely transforming in orthogonal the decoded orthogonal transform coefficient, motion compensation means 104 for performing a motion compensation of the moving picture signal on the basis of identified data $S_{24}$ outputted from the decoding control means 31, motion vector data $S_{25}$ outputted from the additional data redundancy decompression means 38 and reference image data $S_{26}$, reference image data storage means 105 for outputting the reference image data $S_{26}$, and decoded signal generation means 106 for outputting a decoded signal $S_{28}$ by generating on the basis of the identified data $S_{24}$ outputted from the decoding control means 31, a motion compensation signal outputted from the motion compensation means 104 and the decode moving picture signal which is supplied from the inverse orthogonal transform means 110 after the inverse orthogonal transform.

Since operation of the decoding system according to the third embodiment having the above configuration corresponds to steps ST8 through ST16 in the decoding method according to the first embodiment which has been described in reference with FIG. 3, the duplicated description will be omitted. Processing in steps ST8 and ST9 shown in FIG. 3 is performed by dotted arrows between the decoding control means 31 and the additional data variable length code decoding means 35 shown in FIG. 5.

Figure 6:
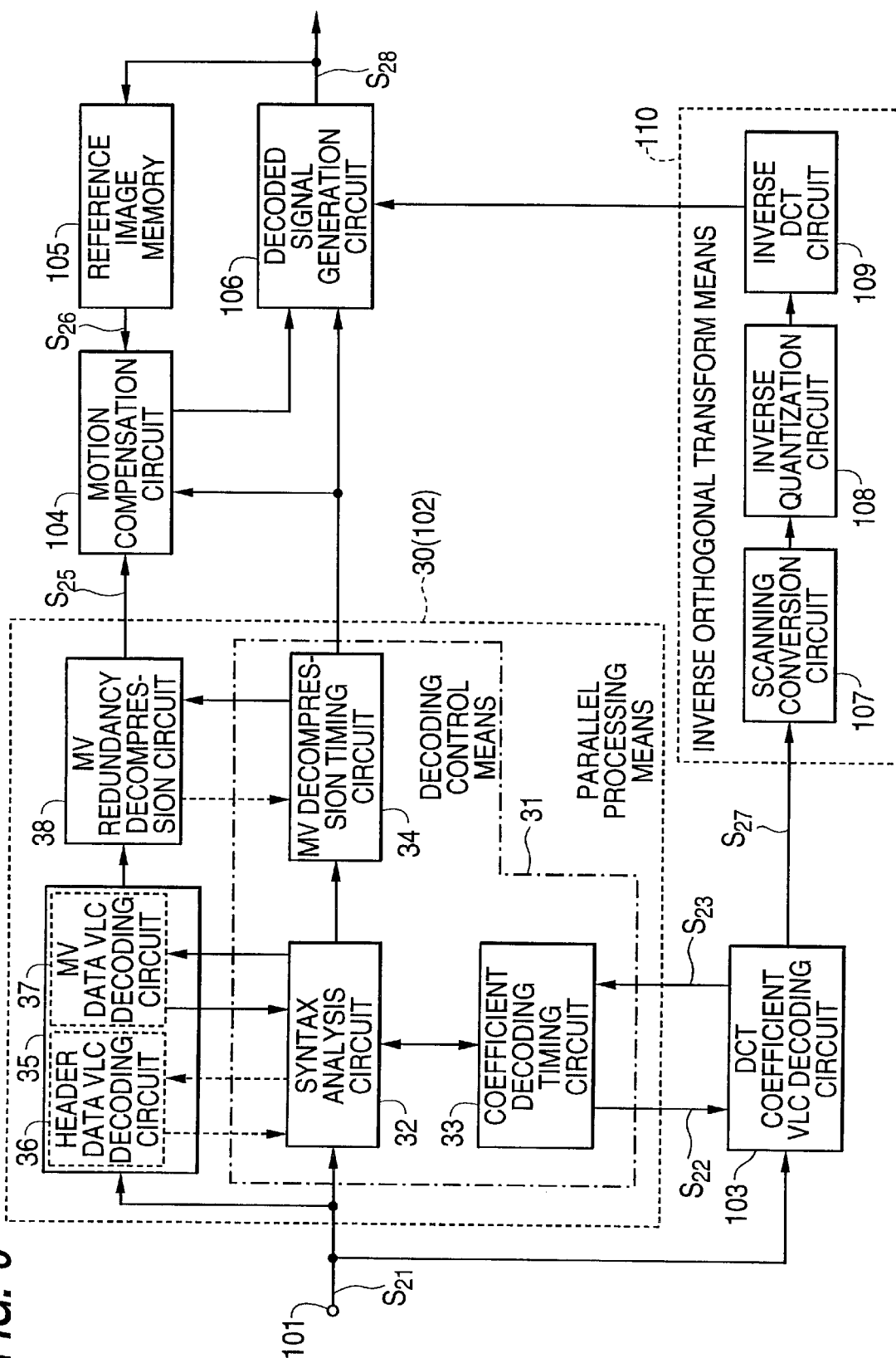
FIG. 6 is a block diagram showing a decoding system of a moving picture coded signal according to a fourth embodiment of the present invention.

FIG. 6 shows a decoding system according to a fourth embodiment having a detailed configuration of the decoding system according to the third embodiment shown in FIG. 5. Since the fourth embodiment is materialized from the decoding system according to third embodiment, concrete circuits are disclosed for constituting the decoding control means 31, the additional data variable length code decoding means 35 and the inverse orthogonal transform means 110, respectively.

In FIG. 6, the decoding control means 31 comprises a syntax analysis circuit 32 for analyzing respective syntax of macro blocks constituting a bit stream of the input moving picture coded signal $S_{31}$, a coefficient decoding timing circuit 33 provided between a DCT coefficient VLC decoding circuit 103 as the orthogonal transform coefficient variable length code decoding means and the syntax analysis circuit 32 and for controlling a timing of the decoding of the variable length code (VLC) of the coefficient code, and a MV (motion vector) decompression timing circuit 34 provided between a motion vector (MV) redundancy decompression circuit 38 as the additional data redundancy decompression means and the syntax analysis circuit 32 and for controlling a timing of the redundancy decompression of the motion vector. The additional data variable length code decoding means 35 comprises a header data VLC decoding circuit 36 for decoding a variable length code (VLC) of header data as the identified data as to whether the motion compensation should be done or not, and a MV data VLC decoding circuit 37 for decoding the VLC of the motion vector data in the case where a certain macro block of the signal $S_{21}$ has header data for performing a motion compensation.

Furthermore, in the decoding system according to the fourth embodiment, the inverse orthogonal transform means 110 comprises a scanning conversion circuit 107 for restoring a zigzag scanning of the signal $S_{27}$ outputted from the DCT coefficient VLC decoding circuit, an inverse quantization circuit 108 for inversely quantizing the DCT coefficient in which a zigzag scanning is performed, and an inverse DCT circuit 109 for inversely transforming the DCT coefficient.

Since operation of the decoding system according to the fourth embodiment corresponds to operation in each step of the decoding method according to the first embodiment described by using the flow chart shown in FIG. 3, the duplicated description will be omitted.

Figure 7:
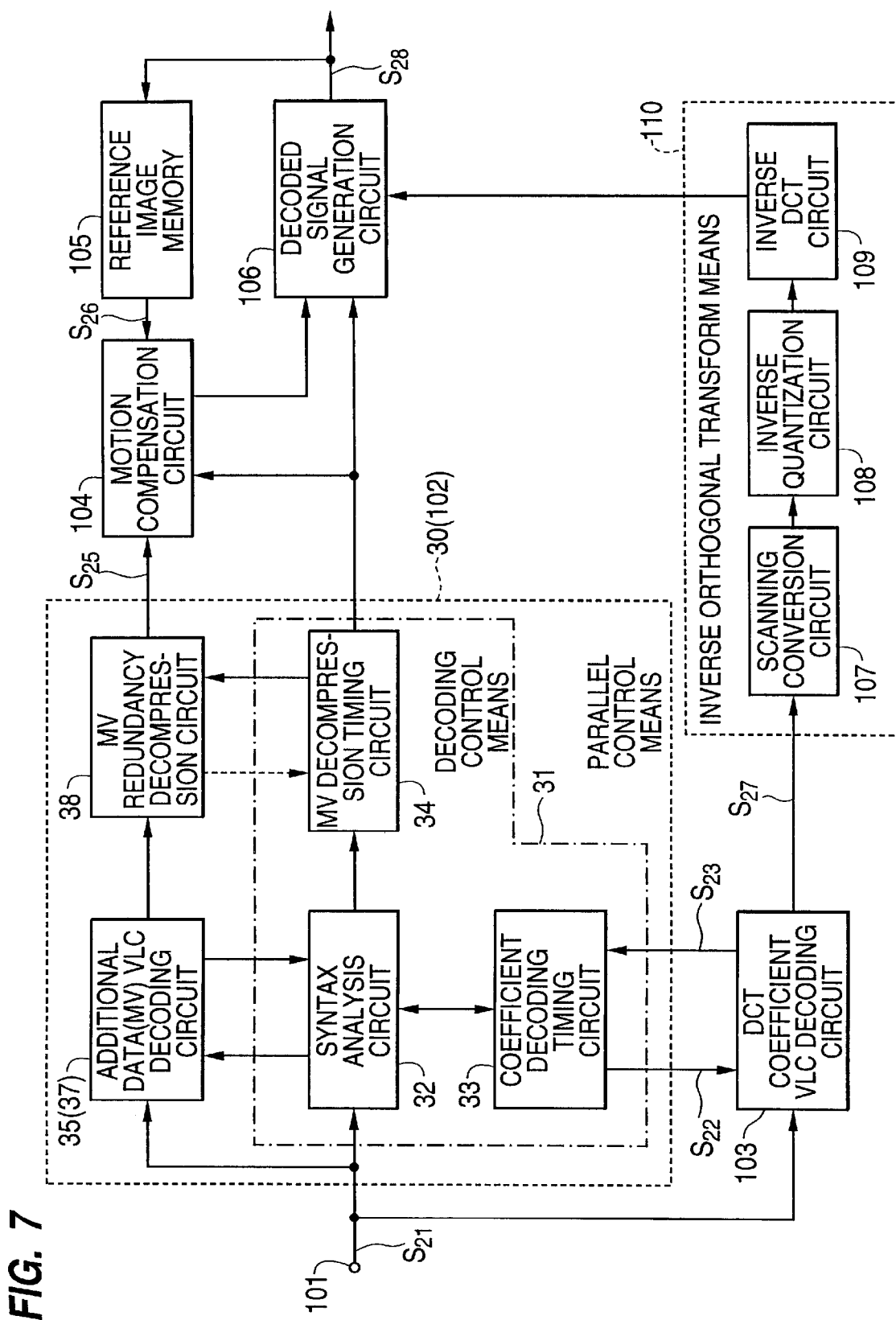
FIG. 7 is a block diagram showing a decoding system of a moving picture coded signal according to a fifth embodiment of the present invention.

Next, there is described a decoding system according to a fifth embodiment in accordance with FIG. 7. The decoding system shown in FIG. 7, is usable for utilizing the decoding system according to the second embodiment including the processing steps shown in the flow chart of FIG. 4, and necessarily performs a motion compensation because all of macro blocks each constituting a moving data include the motion vector data.

Accordingly, in FIG. 7, the additional data variable length code decoding means 35 only includes an MV data VLC decoding circuit 37. The syntax analysis circuit 32 causes the MV data VLC decoding circuit 37 to be stopped when the decoding circuit 37 outputs a signal which represents an end of the decoding of the MV data. During the stop of the decoding circuit 37, the syntax analysis circuit 32 respectively outputs an MV decompression timing control signal and a coefficient decoding control signal a coefficient decoding timing circuit 33 and an MV decompression timing control circuit 34, thereby causing them to parallel process the decompression of the MV redundancy and the decoding of the DCT coefficient VLC.

Next, there is described a decoding system according to a fifth embodiment of the present invention with reference to FIG. 7. The decoding system shown in FIG. 7 is usable for utilizing the decoding method according to the second embodiment including the processing steps shown in FIG. 4. The decoding system necessarily performs a motion compensation because all of the macro blocks constituting the motion image data include motion vector data.

Accordingly, in FIG. 7, the additional data variable length code decoding means 35 only includes an MV data VLC decoding circuit 37. The syntax analysis circuit 32 causes the decoding circuit 37 to be temporarily stopping condition when the decoding circuit 37 outputs a signal which means an end of decoding of the MV data. While the stopping condition, the syntax analysis circuit 32 outputs a coefficient decoding timing control signal to a circuit 32 and an MV decompression timing control signal to a circuit 34, respectively, thereby causing them to parallel a decompression of the MV redundancy and a decoding of the DCT coefficient VLC.

Since operation of the decoding system according to the fifth embodiment corresponds to the processing steps constituting the decoding method of the second embodiment, the duplicated description is omitted.

Figure 8:
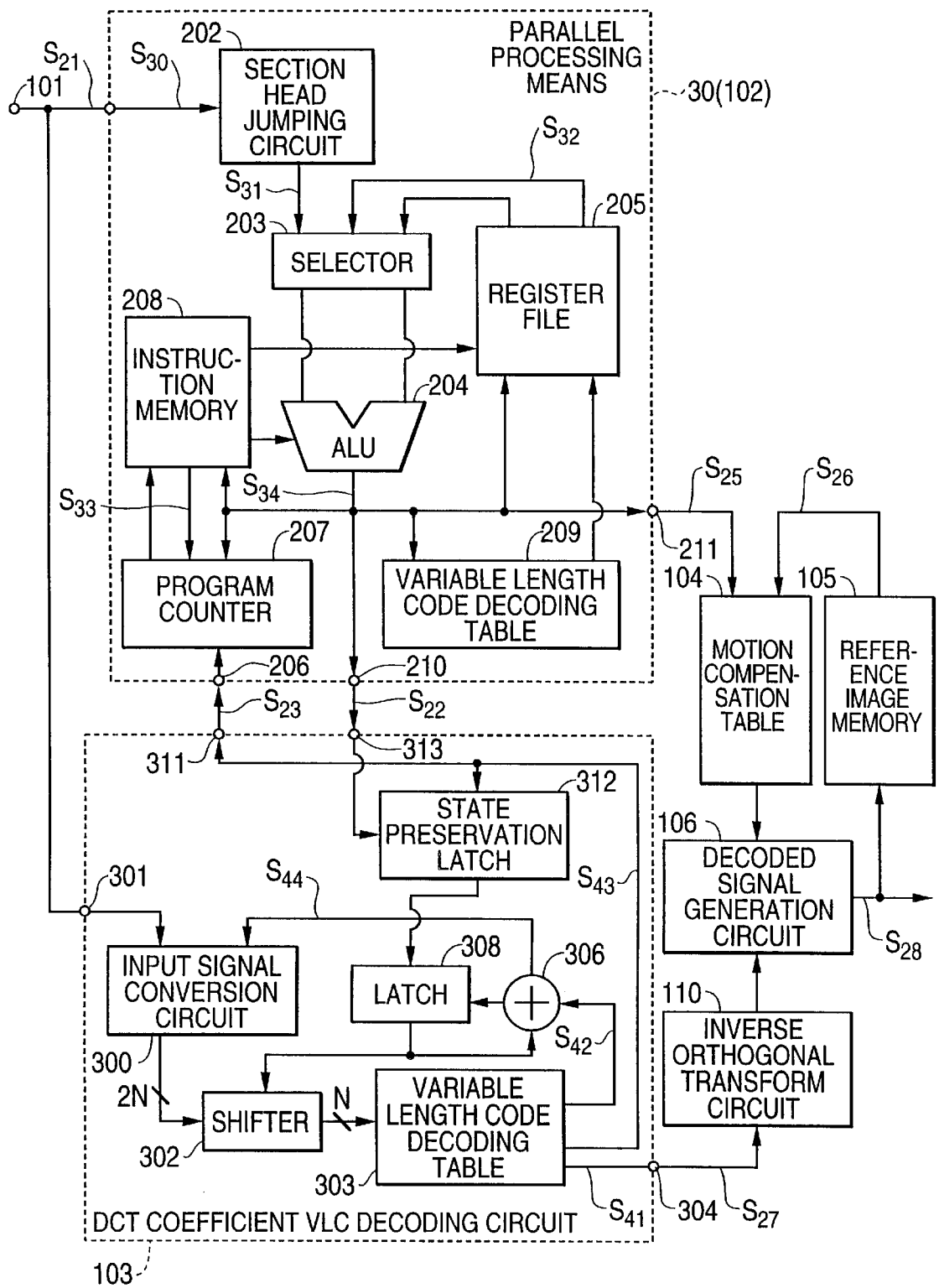
FIG. 8 is a block diagram showing a decoding system of a moving picture coded signal according to a sixth embodiment of the present invention.

FIG. 8 shows a decoding system according to a sixth embodiment of the present invention. The sixth embodiment discloses a detailed configuration of the parallel processing means 30 (102) and the DCT coefficient VLC decoding circuit 103 as a subject matter of the present invention in the decoding system according to the third embodiment.

In FIG. 8, the parallel processing means 30 (102) decompresses the moving picture coded signal $S_{30}$ inputted through a terminal 201 to generate a motion vector redundancy decompression signal $S_{34}$, and comprises a section head jumping circuit 202, a selector 203, an arithmetic logic unit (ALU) 204, a register file 205, a program counter 207, a instruction memory 208 and a variable length code decoding table 209. A terminal 206 is an input terminal to receive a DCT coefficient VLC decoding end signal $S_{23}$, a terminal 210 is an output terminal to output an additional data VLC decoding end signal $S_{22}$, and a terminal 211 is an output terminal to output a motion vector signal $S_{25}$.

Furthermore, the DCT coefficient VLC decoding circuit 103 comprises an input signal conversion circuit 300 for receiving the moving picture coded signal $S_{21}$ through an input terminal 301, a shifter 302, a variable length code decoding table 303, an adder 306, a latch 308 and a state preservation latch 312. A terminal 304 is an output terminal of a DCT coefficient decoded signal $S_{27}$, 311 is an output terminal of a DCT coefficient VLC decoding end signal $S_{23}$, and 313 is an input terminal of an additional date VLC decoding end signal $S_{22}$.

Detailed operation of the parallel processing means 30 (102) and the DCT coefficient VLC decoding circuit 103 in FIG. 8 will be described in a portion of a relevant description of FIGS. 10 and 13.

Figure 9:
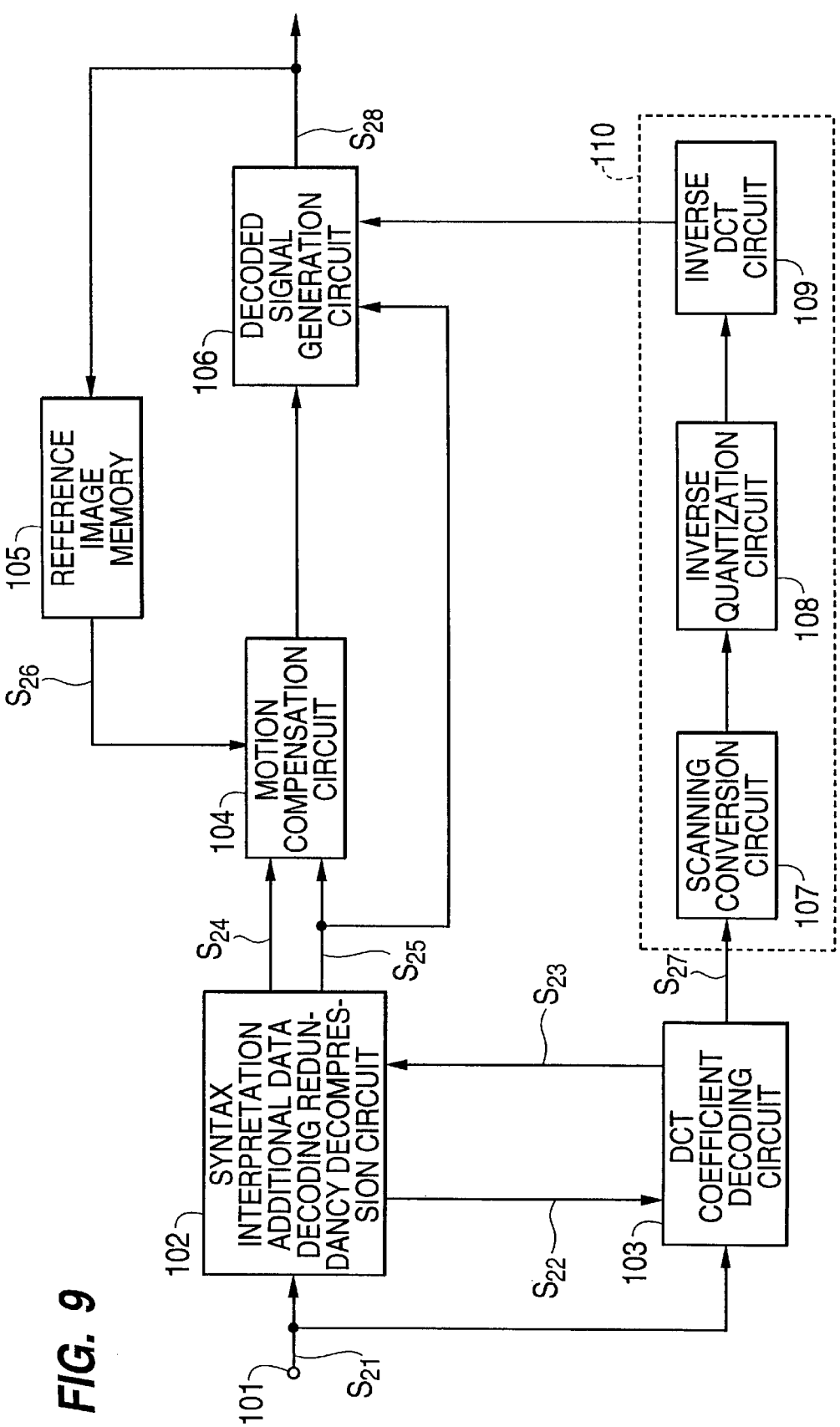
FIG. 9 is a block diagram showing a decoding system of a moving picture coded signal according to a seventh embodiment of the present invention.

FIG. 9 is a block diagram showing a system decoding a moving picture signal according to a seventh embodiment of the present invention.

In FIG. 9, a syntax interpretation/additional data decoding redundancy decompression circuit 102 is a circuit for performing a variable length code decoding for additional data with performing a syntax interpretation and for decompressing a redundancy of the additional data which have been coded. FIG. 10 shows a detailed block diagram of the redundancy decompression circuit 102. In FIG. 9, a DCT coefficient decoding circuit 103 is a circuit for performing a variable length code decoding of a DCT coefficient, and its detailed configuration is shown in FIG. 13.

A compressed moving picture signal is input through an input terminal 101. The syntax-interpretation additional-data-decoding redundancy decompression circuit 102 continues until an end of the additional data to decode an input signal $S_{21}$ from starting and to store in an internal register a decoded result of the additional data such as a motion compensation method and a motion vector.

When the decoding of the additional data is completed, the decompression circuit 102 outputs an additional data end signal $S_{22}$ to the DCT coefficient decoding circuit 103 to be in a redundancy decompression condition for the additional data, and becomes in a stop condition when the redundancy decompression of the additional data is completed. The stop condition is cancelled at a time when the circuit 102 receives the DCT coefficient end signal $S_{23}$. When the DCT coefficient decoding circuit 103 receives the additional data end signal $S_{22}$, the circuit 103 starts to decode the DCT coefficient so as to output a decoded result to a scanning conversion circuit 107. When the decoding of the DCT coefficient is completed, the circuit 103 outputs the DCT coefficient end signal $S_{23}$ to the syntax-interpretation/additional-data-decoding redundancy decompression circuit 102 so as to be in the stop condition.

In the same manner, a decoding of the additional data and a decoding of the DCT coefficient are repeated. The circuit 102 outputs a motion vector data signal $S_{24}$ to a motion compensation circuit 104, and also outputs a motion compensation method signal $S_{25}$ to the motion compensation circuit 104 and a decoded signal generation circuit 106. The motion compensation circuit 104 reads out a reference image signal $S_{26}$ from a reference image memory 105 on the basis of the motion compensation method signal $S_{25}$ and the motion vector data signal $S_{24}$ to output the signal $S_{26}$ to the decoded signal generation circuit 106.

On the other hand, the DCT coefficient data signal $S_{27}$ is decoded scanning by inverse zigzags in the scanning conversion circuit 107, is inversely quantized in the inverse quantization circuit 108, and is performed by an inverse DCT transformation in the inverse DCT circuit 109, so as to be output to the decoded signal generation circuit 106.

The decoded signal generation circuit 106 receives the inverse DCT result, the reference image, and the motion vector method data, generates a decoded signal $S_{28}$ by adding the reference image with the inverse DCT result when the motion compensation should be performed. When the motion compensation is not performed, the circuit 106 outputs the inverse DCT result as it is to be the decode signal $S_{28}$.

Figure 10:
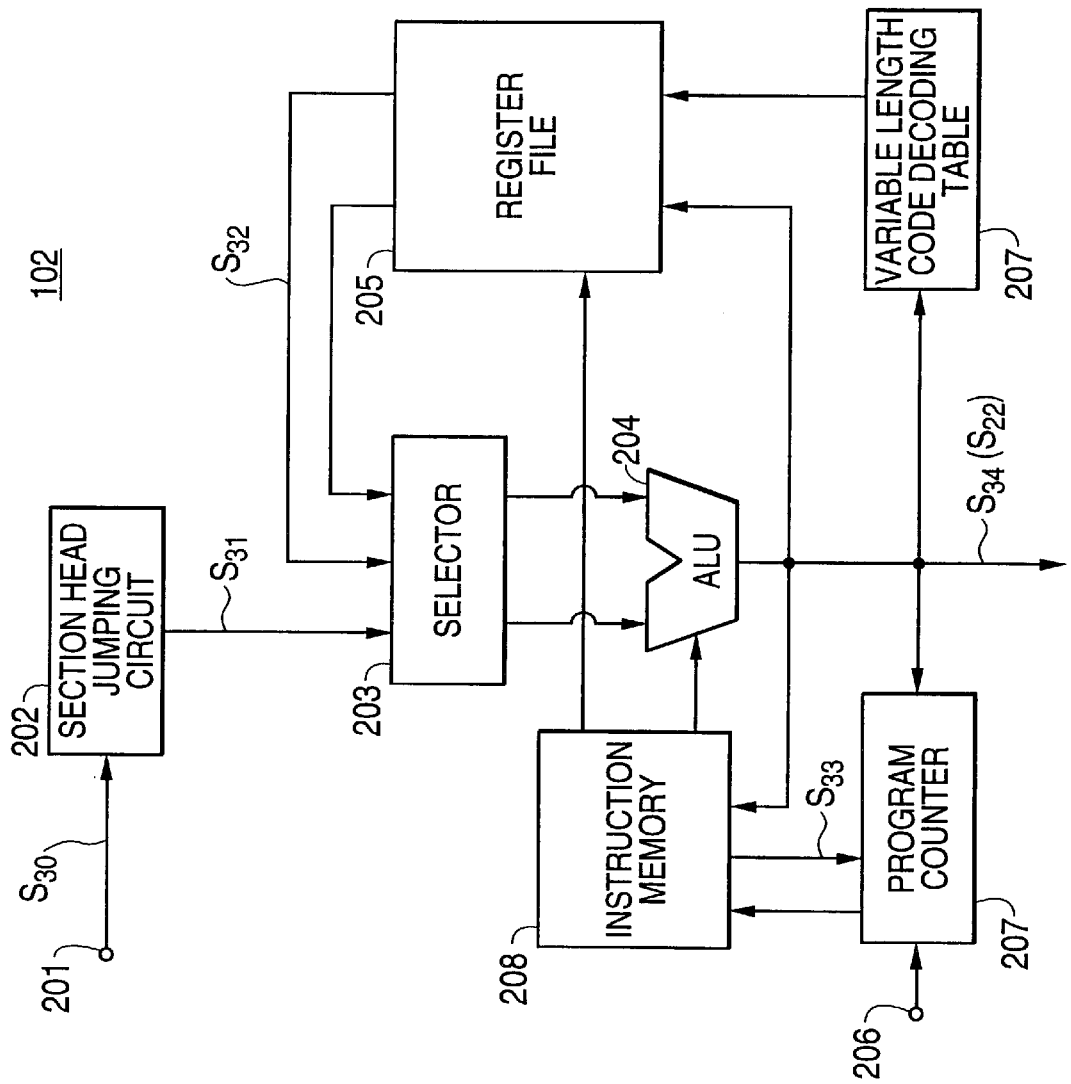
FIG. 10 is a block diagram showing a detailed configuration of a component of the decoding system of the seventh embodiment shown in FIG. 9.
Figure 11:
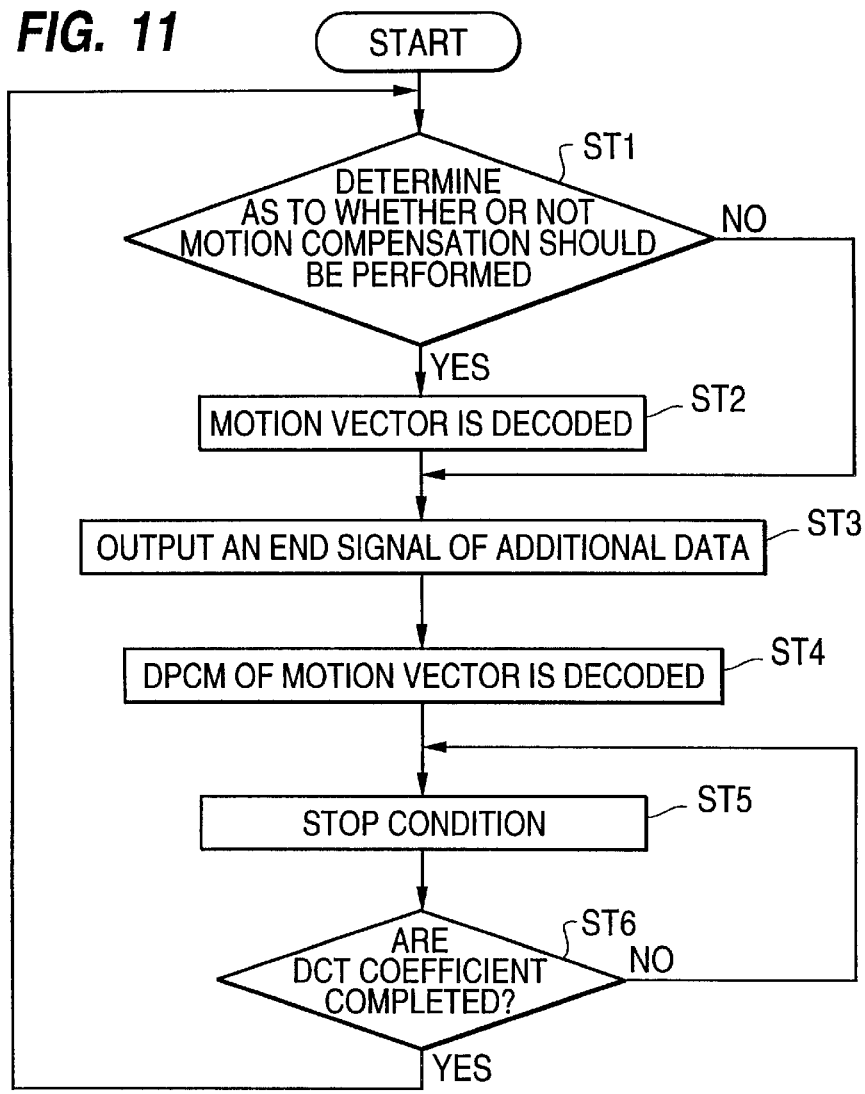
FIG. 11 is a flow chart showing processing steps of syntax interpretation method and additional data redundancy expansion method shown in FIG. 10.

The block diagram of FIG. 10 shows a detailed configuration of the syntax-interpretation/additional-data-decoding/redundancy-decompression circuit 102. As shown in FIG. 11, a bit stream syntax interpretation method and an additional data redundancy decompression method (for example, a DPCM restoring method) are previously loaded in a instruction memory 208. FIG. 12 shows an arrangement of the input bit stream.

An input signal $S_{30}$ is input through an input terminal 201 to a section head jumping circuit 202 to output a bit stream $S_{31}$ of which a starting head is taken out. The end signal $S_{23}$ from the DCT coefficient decoding circuit 103 is supplied through a DCT coefficient end signal input terminal 206.

In a variable length code decoding cycle, a selector 203 selects the bit stream $S_{31}$ in order to obtain the motion compensation method, and an arithmetic and logic unit (ALU) 204 processes nothing and outputs the bit stream $S_{31}$ to store in a variable length code decoding table 209, thereby storing a decoded result into a register file 205. Since there is a result in which the motion compensation is used, a next motion vector data are decoded. The selector 203 selects the bit stream $S_{31}$ in which a head is jumped to be taken to obtain a decode of the motion vector data. Since the ALU processes nothing, the bit stream $S_{31}$ is input into the variable length code decoding table 209 to store the motion vector data in the register file 205 which is directed by the instruction memory 208.

At this time point, since the decoding of the additional data is completed, the additional data end signal $S_{34}$ ($S_{22}$) is outputted in the next clock. An address describing a processing of a decoding cycle DPCM in the instruction memory 208 is loaded is loaded in program counter 207 to be in a restoring cycle of the DPCM of the motion vector data. In the DPCM restoring cycle, there is a calculation such as addition and subtraction between read out motion vector data which is read out from the register file 205 which is directed by the instruction memory 208 and previously motion vector.

When the restoration of DPCM is completed, an address describing the stop condition is loaded in a program counter 207 to be in the stop condition. When the counter 207 receives the DCT coefficient end signal through an input terminal 206, the stop condition is released to execute the next variable length code decoding cycle for the succeeding macro block.

In the variable length code decoding cycle, the ALU 204 processes nothing with respect to the bit stream signal $S_{31}$ in order to obtain the motion compensation method, and supplies the signal $S_{31}$ as it is to the variable length code decoding table 209, thereby storing the decoded result in the register file 205 which is directed by the instruction memory 204. Next, the ALU has a result that the motion compensation is not used with respect to the clock, thereby outputting the additional data end signal $S_{34}$.

In the case where the motion compensation is not performed, since it is unnecessary to restore the DPCM of the motion vector data, the decompression circuit 102 immediately becomes in the stop condition. However, in the case of the MPEG in which the motion compensation is not performed, a discrete cosine (DC) component of the DCT coefficient is coded by the DPCM. In this case, the restoration of the DC component is performed by the inverse DPCM, thereby making a program in the manner that the decompression circuit 102 is in the stop condition at the time when the restoration is completed.

When the program counter 207 receives the DCT coefficient end signal through the input terminal 206, the stop condition is released to execute the succeeding variable length code decoding cycle of the next macro-block.

After that, the decoding of the additional data and decompression of the redundancy are performed in the same manner.

Figure 13:
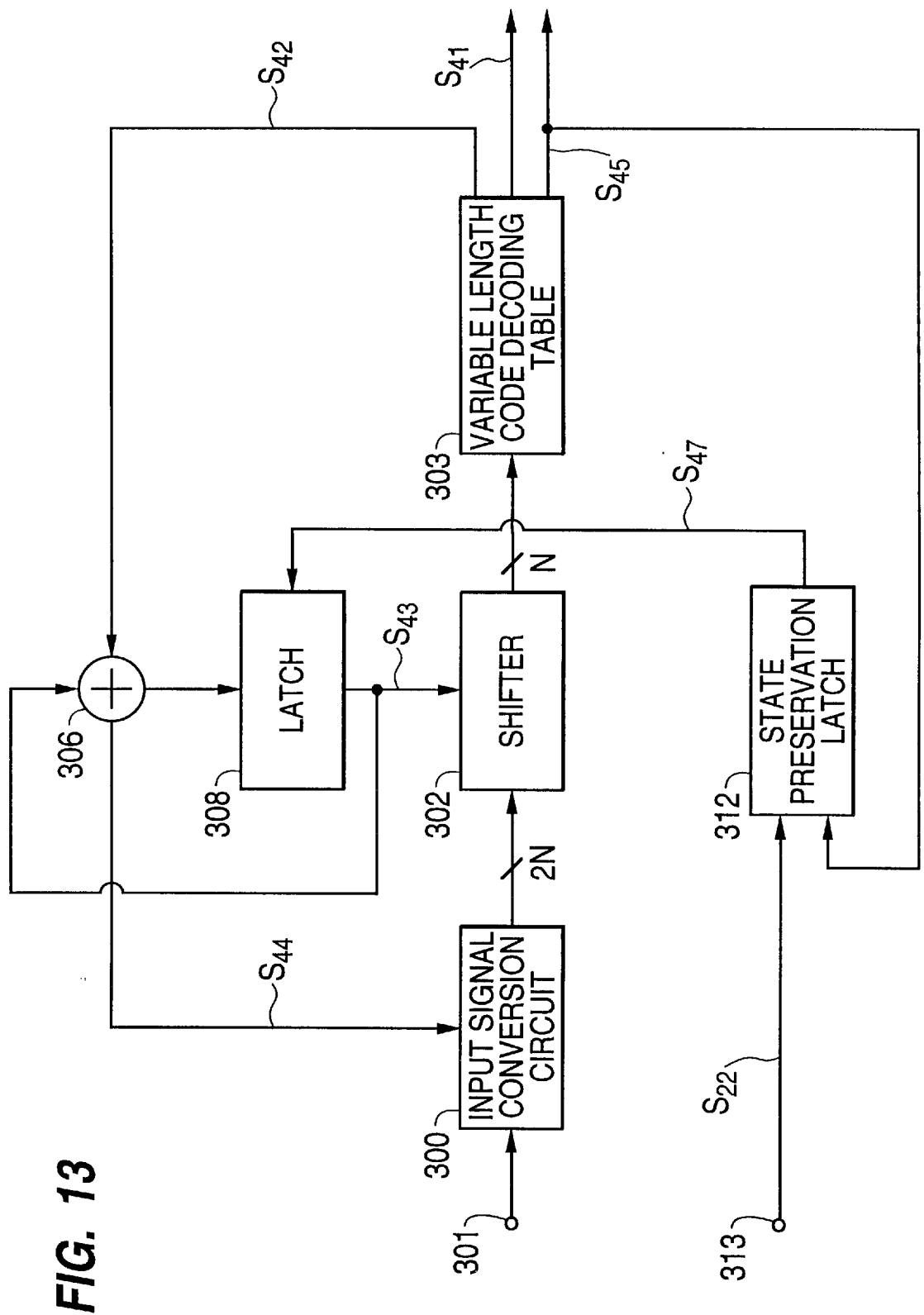
FIG. 13 is a block diagram showing a detailed configuration of other component of the decoding system according to the seventh embodiment shown in FIG. 9.

FIG. 13 is a detailed block diagram showing the DCT coefficient decoding circuit 103.

In FIG. 13, a compressed DCT coefficient is input through an input terminal 301 with an N-bit width (where N is a value more than the maximum code length of the variable length code). The compressed DCT coefficient is supplied to an input signal conversion circuit 300 in which the coefficient is converted in a bit train having 2N bit width to output it to a shifter 302. The shifter 302 shifts the bit train on the basis of the past shift data $S_{43}$ supplied from a latch 308, so as to direct a head of the decoded bit train, thereby outputting a bit train having an N-bit width to a variable length code decoding table 303. The variable length code decoding table 303 outputs a decoded result signal $S_{41}$ when the bit train having the N-bit width coincides with the bit train supplied to the decoding table 303. The decoding table further outputs a code length signal $S_{42}$ and a flag signal $S_{45}$ which representing as to whether the DCT coefficient is completed or not. An adder 306 adds the code length signal $S_{42}$ and the past shift data signal $S_{43}$ to output a request signal $S_{44}$ for requiring an input of new N-bit when the added result is more than an N. When a clock signal $S_{46}$ is input through a clock terminal 309, the latch 308 holds a value which is subtracted an N from the added result in the case where the request signal $S_{44}$ is output from the adder 306, and the input signal conversion circuit 300 dumps an older N-bit code from the bit train having 2N bit width and accepts a bit train of an N-bit which is newly supplied. When the flag signal $S_{43}$ shows that the DCT coefficient is completed, the flag is stored in the state preservation latch 312. The content $S_{47}$ of the state preservation latch 312 is supplied to a clock enable terminal of the latch 308, thereby stopping the DCT coefficient decoding circuit 103 when the DCT coefficient is completed. The additional data end signal $S_{22}$ is supplied from the additional data decoding circuit 102 through an input terminal 313 to a clear terminal of the state preservation latch 312 to release the stop condition.

What is claimed is:

1. A system for generating a decoded moving picture signal by decoding moving picture coded data including motion vector data showing a motion in a moving picture, and prediction error data as a discrepancy of an original moving picture and a moving picture predicted by using said motion, said system comprising:

decoding control means for starting an operation when header data attached before said motion vector data are supplied after receiving said moving picture coded data, controlling a decoding of each of said prediction error data and additional data including said header data and said motion vector data, and controlling a decompression of a redundancy of a variable length code of said motion vector data after being decoded;

first decoding means for decoding said variable length code of said motion vector data included in said moving picture coded data responsive to a decoding start signal outputted from said decoding control means, thereby outputting a decoding end signal;

second decoding means for decoding said variable length code of said prediction error data in response to a control of said decoding control means after said decoding end signal is outputted; and decompression means for decompressing a redundancy of said variable length code of said motion vector data which are decoded by said first decoding means, while said second decoding means decodes said variable length code of said prediction error data;

wherein said decoding control means, said first decoding means and said decompression means are constituted in a same module as parallel processing means, thereby parallel processing said decoding of said variable length code of said prediction error data and said decompression of said redundancy of said variable length code of said motion vector data by controlling an operation timing of decoding operation of said second decoding means and decompression operation of said decompression means by means of said decoding control means;

wherein said decoding control means comprises a syntax analysis circuit for analyzing a syntax which is a constitution of said moving picture coded data of a predetermined supplied macro block by detecting said header data of said macro block included in said moving picture coded data which are supplied from a coding system;

a coefficient decoding timing circuit for controlling a timing of a decoding of said variable length code of said DCT coefficient by decoding said variable length code about said additional data by said first decoding means according to said syntax which has been analyzed by said syntax analysis circuit, by causing said second decoding means to start said decoding of said variable length code about said DCT coefficient as said prediction error data, and by receiving a decoding end signal from said second decoding means when there is completed a decoding of said variable length code about said DCT coefficient; and an MV decompression timing circuit provided between a motion vector (MV) redundancy decompression circuit as said decompression means and said syntax analysis circuit for controlling a decompression timing of said redundancy of said coded variable length code of said motion vector data which are supplied from said first decoding means by synchronizing said MV redundancy decompression circuit with a start of said decoding of said variable length code about said DCT coefficient by said second decoding means;

wherein said first decoding means comprises an additional data (MV) variable length (VLC) decoding circuit and is formed in a same module with said syntax analysis circuit, said coefficient decoding timing circuit, said MV decompression timing circuit and said MV redundancy decompression circuit; and wherein said second decoding means is formed in another module different from said module and comprises a DCT coefficient variable length code (VLC) decoding circuit.

2. A system for generating a decoded moving picture signal by decoding moving picture coded data including first moving picture coded data having header data showing an absence of a motion compensation and moving picture data, and second moving picture coded data having header data showing a motion on a moving picture and prediction error data, said system comprising:

decoding control means for controlling a decoding of each of variable length codes of said prediction error data and additional data including said header data and said motion vector data after receiving said moving picture coded data and starting when said header data of said moving picture coded data are supplied, and for controlling a redundancy decompression of a variable length code of said motion vector data decoded when said additional data includes said header data of the presence of the motion vector and motion vector data after said header data are decoded;

first decoding means for decoding said variable length code of said header data when said additional data only includes said header data responding to a decoding start signal which is outputted from said decoding control means, and for controlling said variable length code of said header data and said motion vector data when said additional data includes said header data and said motion vector data, thereby outputting a decoding end signal;

second decoding means for decoding said variable length code and said motion vector data when said additional data only includes said header data, and for decoding said variable length code of said prediction error data when said additional data includes said header data and said motion vector data, in response to a control of said decoding control means after said first decoding means output said decoding end signal; and decompression means for decompressing said redundancy of said variable length code of said motion vector data which are decoded by said first decoding means while said second decoding means is decoding said variable length code of said prediction error data when said additional data includes said header data and said motion vector data;

wherein said decoding control means, said first decoding means and said decompression means are configured in a same module as parallel processing means which performs a parallel processing of a decoding of said variable length code of said prediction error data and a decompression of said redundancy of said decoded variable length code of said motion vector data in the manner that said decoding control means controls an operation timing of decoding operation of said second decoding means and decompression operation of said decompression means when said moving picture coded data is said second moving picture coded data;

wherein said decoding control means comprises
  a syntax analysis circuit for analyzing a syntax which is a constitution of said moving picture coded data of a predetermined supplied macro block by detecting said header data of said macro block included in said moving picture coded data which are supplied from a coding system, and for determining as to whether said supplied moving picture coded data is said first moving picture coded data or said second moving picture coded data;
  a coefficient decoding timing circuit for controlling a timing of a decoding of said variable length code of said DCT coefficient by decoding said variable length code about said header data by said first decoding means according to said syntax which has been analyzed by said syntax analysis circuit when said macro block includes said first moving picture coded data, by causing said second decoding means to start said decoding of said variable length code about a discrete cosine transform (DCT) coefficient as said moving picture data, or by decoding said variable length code of said header data and said motion vector data by said first decoding means when said macro block includes said second moving picture coded data, by causing said second decoding means to start said coding of said variable length code about said DCT coefficient as said prediction error data, and by receiving a decoding end signal from said second decoding means when there is completed a decoding of said variable length code about said DCT coefficient; and
  an MV decompression timing circuit provided between a motion (MV) redundancy decompression circuit as said decompression means and said syntax analysis circuit for controlling a decompression timing of said redundancy of said coded variable length code of said motion vector data which are supplied from said first decoding means by synchronizing said MV redundancy decompression circuit with a start of said decoding of said variable length code about said DCT coefficient by said second decoding means when said moving picture coded data are said second moving picture coded data;

wherein said first decoding means comprises an header data variable length (VLC) decoding circuit and motion vector (MV) data VLC decoding circuit for decoding a VLC of the motion vector (MV) data, and is formed in a same module with said syntax analysis circuit, said coefficient decoding timing circuit, said MV decompression timing circuit and said MV redundancy decompression circuit; and where said second decoding means is formed in another module different from said module and comprises a DCT coefficient variable length code (VLC) decoding circuit.

3. A moving picture decoding apparatus for decoding moving picture coded data transmitted from a moving picture coding apparatus including means for dividing input image data into a plurality of blocks, means for generating selection data to determine as to whether a divided block or a residual signal compensating a motion should be orthogonally transformed, means for compressing a redundancy in said selection data and additive data, means for orthogonally transforming a selected signal by said means for generating said selection data by using a predetermined transform coefficient, and means for multiplying said additive data and a predetermined transform coefficient so as to generate coded data, and for decoding moving picture coded data including motion vector (MV) data showing a motion in a moving picture, and prediction error data as a discrepancy between an original moving picture and a moving picture predicted by using said motion, said moving picture decoding apparatus comprising:

a first decoding circuit for decoding a variable length code (VLC) of said additive data;

a second decoding circuit for decoding a VLC of said predetermined transform coefficient;

a syntax analysis circuit for analyzing a syntax which is a constitution of said moving picture coded data of a predetermined supplied macro block by detecting header data of said macro block included in said moving picture coded data which are supplied from the coding apparatus;

a coefficient decoding timing circuit for controlling a timing of decoding of a variable length code of said predetermined transform coefficient by decoding said variable length code about said additive data according to said syntax which has been analyzed by said syntax analysis circuit, by causing said second decoding circuit to start decoding of the VLC of said predetermined transform coefficient as said prediction error data, and by receiving a decoding end signal from said second decoding circuit on completion of a decoding of said variable length code about said predetermined transform coefficient;

an MV decompression circuit for decompressing a redundancy of the VLC of said motion vector data which are decoded by said first decoding circuit, while said second decoding circuit is decoding the VLC of said prediction error data; and an MV decompression timing circuit provided between said syntax analysis circuit and said MV decompression circuit for controlling a decompression timing of said redundancy of the coded VLC of said motion vector data which are supplied from said first decoding circuit by synchronizing said MV redundancy decompression circuit with a start of the decoding of said VLC about said predetermined transform coefficient by said second decoding means;

wherein said first decoding circuit, said syntax analysis circuit, said coefficient decoding timing circuit, said MV decompression timing circuit are constituted in a first chip or module, and said second decoding circuit is constituted in a second chip or module.

4. The moving picture decoding apparatus according to claim 3, further comprising:

an inverse orthogonal transform circuit for receiving said prediction error data which are supplied from said second decoding circuit and in which the VLC is decoded, and for inversely and orthogonally transforming said prediction error data to output;

a motion compensation circuit for compensating a motion on a reference image by said motion vector after receiving said motion vector in which said redundancy is decompressed and which is supplied from said MV decompression circuit, and after receiving said reference image on the basis of a decoded signal which has been previously generated;

a reference image memory for storing said reference image which is renewed in order on the basis of said decoded signal which has been generated; and a decoded signal generation circuit for generating said decoded signal to be outputted on the basis of an output of said inverse orthogonal transform circuit, an image which is outputted from said motion vector compensation circuit and in which a motion has been compensated, and a motion vector timing is supplied from said MV decompression timing circuit.

5. The moving picture decoding apparatus according to claim 4, wherein said inverse orthogonal transform circuit comprises:

a scanning conversion circuit for inversely scanning a discrete cosine transform (DCT) coefficient which has been zigzag scanned after receiving said DCT coefficient as said prediction error data in which the VLC has been decoded and which are supplied from said second decoding circuit;

an inverse quantization circuit for inversely quantizing an output from said scanning conversion circuit; and an inverse DCT circuit for inversely and orthogonally transforming said DCT coefficient which is inversely quantized by said inverse quantization circuit so as to output said prediction error data which have been decoded to said decoded signal generation circuit.

* * * * *